United States Patent [19]

Nakahara et al.

[11] 4,441,596

[45] Apr. 10, 1984

[54] VEHICLE INCHING MECHANISM INTERLOCKED WITH A BRAKING MECHANISM

[75] Inventors: Teruo Nakahara, Komatsu; Shingo Ota, Kanazawa; Masaru Nakamura, Matsutou, all of Japan

[73] Assignee: Kabushiki Kaisha Komatsu Seisakusho, Tokyo, Japan

[21] Appl. No.: 333,794

[22] Filed: Dec. 23, 1981

[30] Foreign Application Priority Data

Dec. 26, 1980 [JP] Japan .............................. 55-186693

[51] Int. Cl.$^3$ ............................................ B60K 41/24
[52] U.S. Cl. ............................... 192/13 R; 192/12 C; 74/478; 74/480 R; 74/512
[58] Field of Search .................. 192/13 R, 13 A, 4 A, 192/12 R, 12 A, 17 A; 74/480, 512, 478

[56] References Cited

U.S. PATENT DOCUMENTS

| | | | |
|---|---|---|---|
| 2,065,459 | 12/1936 | Jenkins | 74/478 |
| 2,883,015 | 4/1959 | Schroeder | 192/13 R |
| 3,262,525 | 7/1966 | Ehlke et al. | 192/13 R |
| 3,935,932 | 2/1976 | Moorhouse | 192/13 R |
| 4,006,805 | 2/1977 | Zeller et al. | |
| 4,114,738 | 9/1978 | Brown | 192/13 R |

*Primary Examiner*—George H. Krizmanich
*Attorney, Agent, or Firm*—Armstrong, Nikaido, Marmelstein & Kubovcik

[57] ABSTRACT

A vehicle inching mechanism is interlocked with a braking mechanism so as to overlap their operating ranges without hampering the low-speed start or stop of the vehicle by the inching mechanism. An inching pedal and a brake pedal are mounted side by side on a stationary shaft via sleeves rotatably fitted thereover and linked to an inching valve and a brake master cylinder, respectively. The sleeves have square jaws at their opposed ends for mating engagement, with clearances therebetween to allow rotation of either sleeve relative to the other within limits. A torsion spring is anchored at one end to the inching pedal sleeve and held at the other end against an abutment on the brake pedal sleeve. Upon depression of the inching pedal, therefore, not only the inching valve but also the brake master cylinder is activated, first through the torsion spring and then through the intermeshing jaws. The depression of the brake pedal results only in the actuation of the master cylinder.

4 Claims, 4 Drawing Figures

VEHICLE INCHING MECHANISM INTERLOCKED WITH A BRAKING MECHANISM

BACKGROUND OF THE INVENTION

This invention pertains to the working combination of a vehicle inching mechanism and a braking mechanism, interlocked in such a way that the inching and braking operations overlap without making it impossible to start or stop the vehicle by inching.

The vehicle inching system has been known which comprises an inching valve for the on-off control of hydraulic fluid pressure activating a clutch built into a planetary gear transmission. The intermittent engagement of the clutch results in the vehicle movement, in either a forward or reverse direction, in small increments. It has also been known and practiced to start or stop the vehicle at highly reduced speed by gradually increasing or decreasing the fluid pressure until the clutch becomes half engaged.

The inching mechanism is usually interlocked with the braking mechanism of the vehicle. According to the prior art the brake system has been held unactivated during inching operation and applied after clutch disengagement by the inching operation. A problem arose here because of the time lag existing from the moment of clutch disengagement to that of brake application. Being unrestrained during this time lag, the vehicle has been prone to make unexpected travel under its own weight and/or by inertia.

An obvious solution to this problem is to interlock the inching and the braking mechanisms in such a manner that braking takes place before completing declutching. Some requirements must be met in carrying this solution into practice, however. One is that inching and braking operations overlap so as to allow the low-speed start and stop of the vehicle by the inching control. For example, in bringing the vehicle to a stop at low speed, the braking force should gradually increase while the clutch pressure is on a decrease. In starting the vehicle at low speed, on the other hand, the clutch pressure should increase in step with a gradual decrease in braking force.

Another requirement is that the operator, as he depresses the inching pedal to any degree, be enabled to discern whether the clutch pressure is greater than the braking force or vice versa in that pedal posittion. The operator should also be enabled to sense the inching pedal position where the actual clutch capacity equals the braking force. This is because the desired low-speed start and stop of the vehicle take place by gradually releasing or depressing the inching pedal in the vicinity of that position.

SUMMARY OF THE INVENTION

The present invention seeks to interlock a vehicle inching mechanism and a braking mechanism so as to overlap their operations and hence to eliminate a time lag between declutching and braking, thereby averting the risk of unexpected vehicle run. In attaining this objective, moreover, the invention seeks to make it possible to start and stop the vehicle by the inching mechanism in coaction with the braking mechanism. The invention also seeks to enable the operator to sense, during activaton of the inching (as well as braking) mechanism by the depression of an inching pedal, the pedal position where the clutch pressure equals the braking force, thereby contributing to accurate inching control in starting and stopping the vehicle.

According to the invention, stated in brief, an inching pedal and a brake pedal are anchored to respective sleeves rotatably fitted over a stationary shaft. The inching pedal sleeve is linked to an inching valve, and the brake pedal sleeve to a brake master cylinder, for actuating same upon depression of the respective pedals. The two sleeves have intermeshing jaws at their opposed ends, with clearances therebetween to admit of rotary motion of either sleeve relative to the other within limits. A resilient means such as a torsion spring is further connected between the sleeves so as to impart only the revolution of the inching pedal sleeve to the brake pedal sleeve.

Thus, upon depression of the inching pedal, not only the inching valve but also the brake master cylinder is actuated, the revolution of the inching pedal sleeve being transmitted to the brake pedal sleeve first through the torsion spring and then through their intermeshing jaws. Initially, however, the torsion spring transmits the torque without being deflected, and no change occurs in the pressure in the brake master cylinder. The braking pressure starts rising just about the time the torsion spring starts to deflect. With the continued depression of the inching pedal the braking pressure equals the inching valve pressure just about the pedal position where the operator can sense the deflection of the torsion spring. The vehicle can be slowly started or stopped by either releasing or depressing the inching pedal in the neighborhood of that position. The depression of the brake pedal does not affect the inching mechanism.

The above and other features and advantages of this invention will become more apparent, and the invention itself will best be understood, from a study of the following description of a preferred embodiment, with reference had to the attached drawings.

DESCRIPTION OF THE PREFERRED EMBODIMENT

Figure 1:
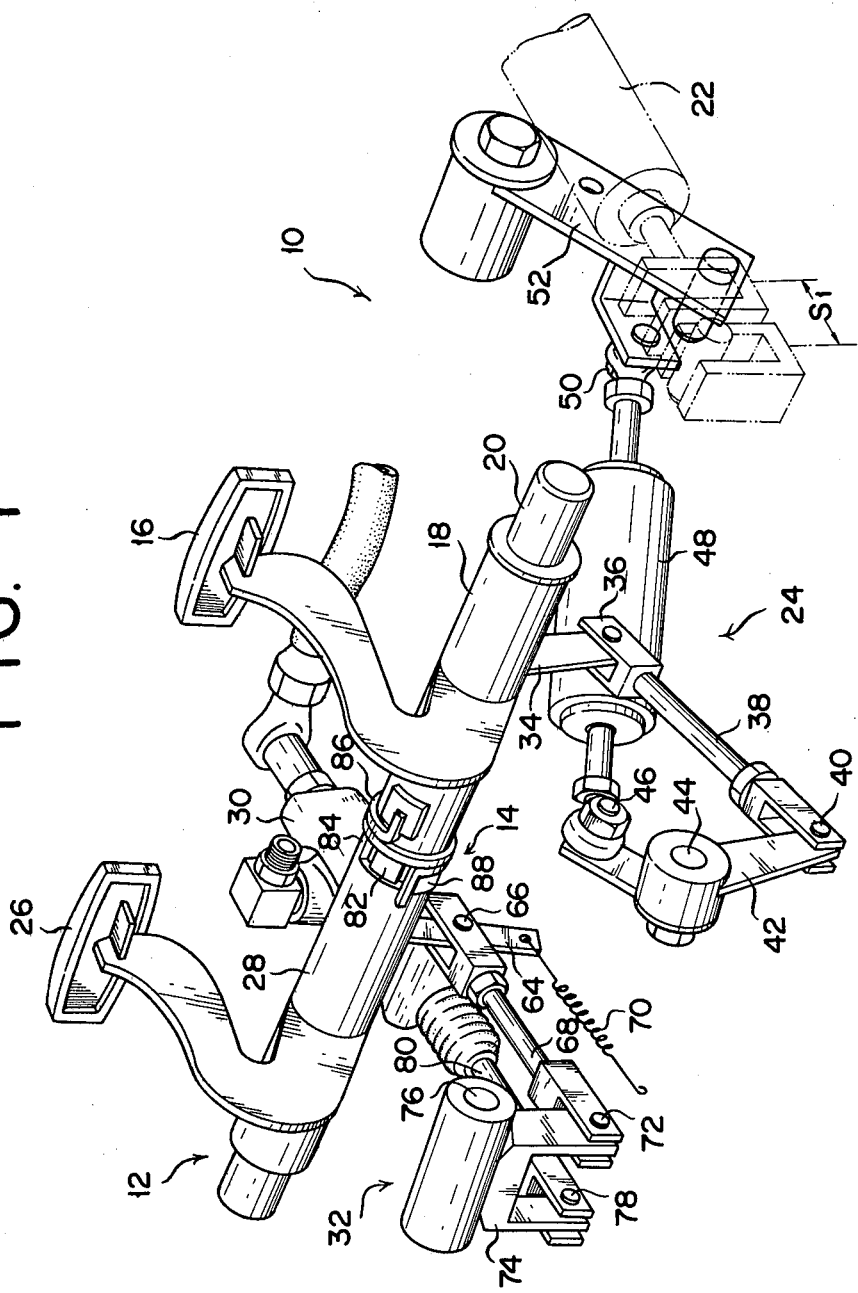
FIG. 1 is a perspective view of a typical inching mechanism and a typical braking mechanism as interlocked in accordance with the present invention.

FIG. 1 illustrates an inching mechanism 10 and a braking mechanism 12 interlocked at 14 in accordance with the novel concepts of this invention. The inching mechanism 10 broadly comprises:

1. An inching pedal 16 formed on a sleeve 18 rotatably fitted over a stationary shaft 20.
2. An inching valve 22 of known construction and operation.
3. A linkage 24 connecting the inching pedal sleeve 18 to the inching valve 22 for actuating the latter in response to the depression of the inching pedal 16.

The braking mechanism 12 broadly comprises:

1. A brake pedal 26 formed on a sleeve 28 rotatably fitted over the stationary shaft 20 in end-to-end relation with the inching pedal sleeve 18.

2. A master cylinder 30 of a known hydraulic brake system.

3. A linkage 32 connecting the brake pedal sleeve 28 to the master cylinder 30.

The invention will hereinafter be described in detail in the order of the inching mechanism 10, the braking mechanism 12, and the means 14 interlocking the inching and braking mechanisms.

The inching pedal 16 is to be depressed by the vehicle operator for actuating the inching valve 22 as well as the brake master cylinder 30. The depression of the inching pedal results in the revolution of the sleeve 18 about the stationary shaft 20. For transmitting the revolution of the inching pedal sleeve 18 to the inching valve 22 the linkage 24 comprises a lever 34 depending from the sleeve. The lever 34 is knuckle jointed at 36 to a link 38, which in turn is knuckle jointed at 40 to one of the offset arms of a bell crank 42 fulcumed on a pivot 44 parallel to the stationary shaft 20. The other arm of the bell crank 42 is pin jointed at 46 to one end of a lost motion mechanism 48, to be detailed later in connection with FIG. 2, forming one of the features of this invention. The other end of the lost motion mechanism 48 is pin jointed at 50 to a lever 52 operatively engaged with the spool of the inching valve 22.

Although FIG. 1 shows the inching valve 22 and its connection to the lever 52 very diagrammatically, it will nevertheless be seen that the inching valve spool travels a predetermined stroke S1 in response to the angular motion of the inching pedal 16. In practice the linkage 24 can take various forms other than the one represented here, provided that the lost motion mechanism 48 or equivalent means is included.

Figure 2:
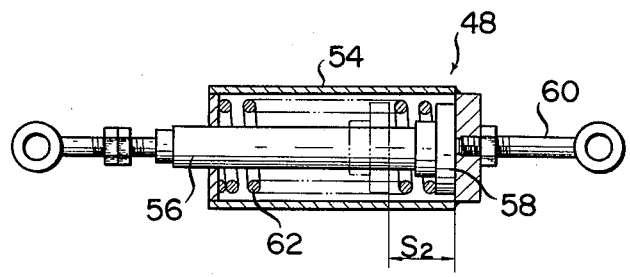
FIG. 2 is an axial sectional view of a lost motion mechanism used in the actuating linkage in the inching mechanism of FIG. 1.

As illustrated in detail in FIG. 2, the lost motion mechanism includes a cylinder or tube 54 closed at both ends. The cylinder 54 houses a stem 56 bearing a flange 58 on one end. The other end of the stem 56 extends with clearance through and projects out of one end of the cylinder 54 for pivotal connection to the bell crank 42 as in FIG. 1. The other end of the cylinder 54 is coupled to the lever 52, FIG. 1, via a rod 60. Sleeved upon the stem 56, a relatively heavy helical compression spring 62 is caught between the flange 58 of the stem and one end of the cylinder 54 for normally holding the stem fully received in the cylinder. The compression spring 62 is sufficiently heavy to transmit motion through the lost motion mechanism without undergoing compression as long as the inching pedal 16 is depressed to such an extent as to cause spool motion in the inching valve 22 within the stroke S1. Only when the inching pedal is depressed beyond the spool stroke of the inching valve does the compression spring 62 deflect a distance S2 to takeup the pedal motion. The depression of the inching pedal through such an additional angle results only in the activation of the brake master cylinder 30, as will be later explained in further detail.

With reference back to FIG. 1 the brake pedal 26 is arranged side by side with the inching pedal 16 and, when depressed, causes revolution of the sleeve 28 about the stationary shaft 20. For transmitting the motion of the sleeve 28 to the brake master cylinder 30 the linkage 32 comprises a lever 64 depending from the sleeve. The lever 64 is knuckle jointed at 66 to a link 68, besides being connected to a relatively light tension spring 70. The link 68 is knuckle jointed at 72 to a bifurcated lever 74 mounted on a pivot 76 parallel to the stationary shaft 20. The lever 74 is knuckle jointed at 78 to the stem 80 of the brake master cylinder 30. Thus, upon depression of the brake pedal 16, the hydraulic fluid in the master cylinder 30 becomes compressed to varying degrees and delivered to brake cylinders, not shown, via piping 82.

Figure 3:
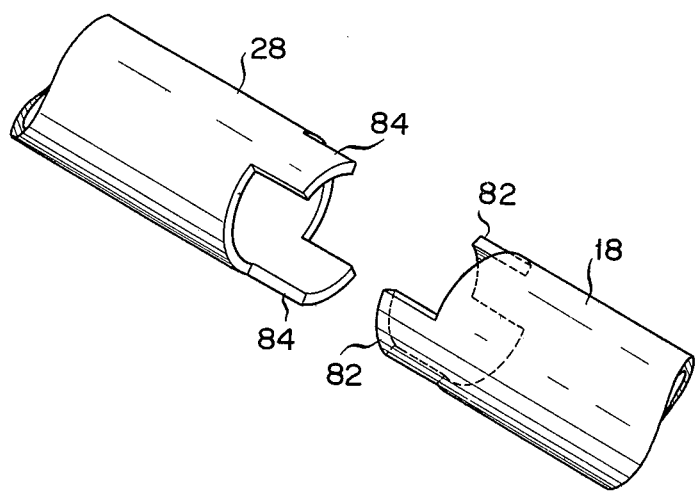
FIG. 3 is a partial, enlarged perspective view of sleeves used in the inching and braking mechanisms of FIG. 1, the view showing in particular the mating jaws at the opposed ends of the sleeves.

The interlocking means 14 comprises two sets of intermeshing square jaws 82 and 84 at the opposed ends of the sleeves 18 and 28 on the stationary shaft 20. As better shown in FIG. 3, each set of jaws 82 or 84 are diametrically opposed to each other and form extensions of the sleeve 18 or 28. In the normal positions of the sleeves 18 and 28 depicted in FIG. 1, circumferential clearances exist on both sides of each jaw 82 or 84, for purposes hereinafter made apparent.

Another component of the interlocking means 14 is a resilient member that takes the form of a torsion spring 86 in the illustrated embodiment. Coiled one or more turns around the stationary shaft 20, the torsion spring 86 is firmly anchored at one end to the inching pedal sleeve 18 and has the other end normally held against an abutment 88 on the brake pedal sleeve 28. Upon depression of the inching pedal 16 the torsion spring 86 acts to impart the consequent revolution of the sleeve 18 to the brake pedal sleeve 28, up to a preassigned angle. The torsion spring 86 does not act upon depression of the brake pedal 26.

Figure 4:
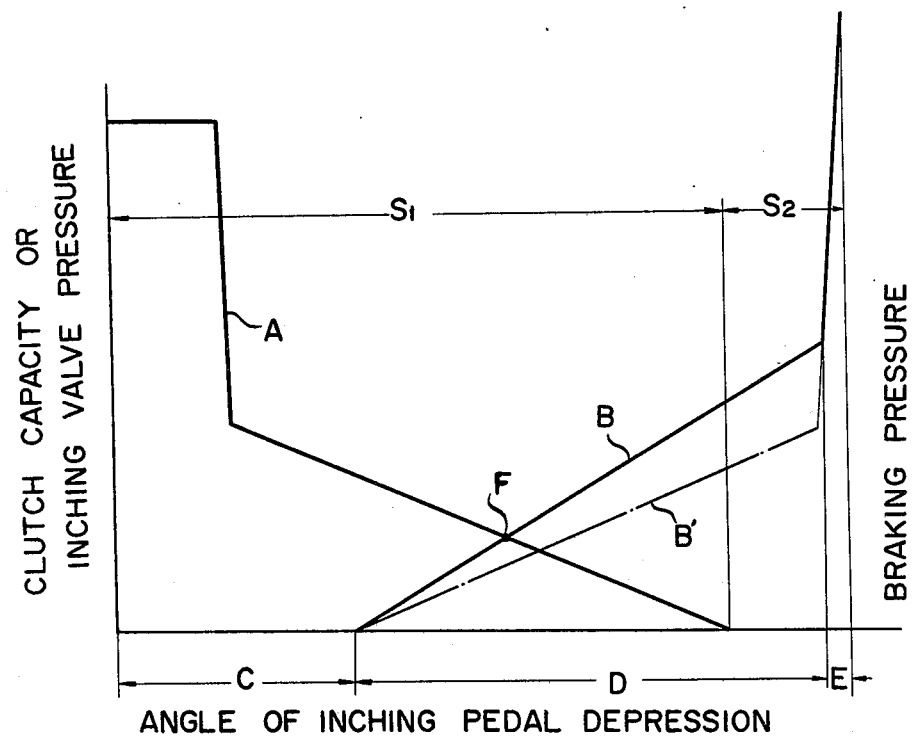
FIG. 4 is a graph explanatory of the performance of the interlocked inching and braking mechanisms of FIG. 1 when the inching pedal is depressed.

The following is the operational description of the embodiment of FIG. 1, with reference directed also to FIG. 4 graphically representing the performance of the inching-braking control system. In this graph the curve A plots the transmission clutch capacity or inching valve pressure against the angle of depression of the inching pedal 16. The curve B plots the braking pressure against the angle of depression of the inching pedal.

Upon depression of the inching pedal 16 the inching valve 22 is actuated via the linkage 24, causing a decrease in the clutch pressure as represented by the curve A in FIG. 4. The depression of the inching pedal 16 is also transmitted to the braking mechanism 12 via the interlocking means 14. Through an initial predetermined angle C, FIG. 4, of the pinching pedal depression the torsion spring 86 imparts the rotation of the inching pedal sleeve 18 to the brake pedal sleeve 28 without deflecting and, as a consequence, with no relative motion between the two sleeves. The brake master cylinder 30 developes no pressure during the inching pedal depression through the angle C.

As the inching pedal 16 is depressed beyond the initial angle C, the torsion spring 86 starts deflecting as it transmits the rotation of the inching pedal sleeve 18 to the brake pedal sleeve 28. The master cylinder 30 starts developing hydraulic fluid pressure for braking the vehicle, as represented by the curve B in FIG. 4. With the deflection of the torsion spring 86 the brake pedal sleeve 28 starts lagging behind the inching pedal sleeve 18 as they revolve around the stationary shaft 20, there being the noted clearances between their mating jaws 82 and 84. The inching pedal sleeve jaws 82 catch up with the brake pedal sleeve jaws 84 upon depression of the inching pedal 16 through an additional angle D immediately following the initial angle C. As the inching pedal 16 is depressed through a further slight additional angle E, the consequent revolution of the inching pedal sleeve 18 is transmitted to the brake pedal sleeve 28 via the jaws 82 and 84 in rigid engagement, instead of via the torsion spring 86, resulting in a rapid increase in the braking pressure.

A consideration of FIG. 4 will reveal that the spool of the inching valve 22 completes its preassigned stroke S1 before the inching pedal is depressed through the angle C+D. During the continued descent of the inching pedal the lost motion mechanism 48 acts to take up the pedal motion by the deflection of its compression spring 62 over the distance S2, thereby allowing the continued activation of the brake master cylinder 30.

It will also be noted from FIG. 4 that the transmission clutch capacity equals the braking pressure at F, shortly after the torsion spring starts deflecting during the depression of the inching pedal 16. The vehicle comes to rest at this point F. The low-speed start and stop of the vehicle take place as the operator slowly releases or presses down the inching pedal 16 in the vicinity of the point F. For thus starting and stopping the vehicle by the inching pedal 16 the operator is required to recognize the pedal position corresponding to the point F. The invention meets this requirement since the operator can discern the pedal position from the resistive force exerted on the inching pedal by the torsion spring 86. As he depresses the inching pedal, the operator will sense the deflection of the torsion spring only at the point F. During the release of the inching pedal from its depressed position, on the other hand, the operator will no longer sense the deflection of the torsion spring as the pedal moves up past the point F. Thus the invention attains the objective of overlapping the working ranges of the inching mechanism 10 and the braking mechanism 12 without making it impossible to start or stop the vehicle by the inching pedal.

The performance characteristics of the inching-braking control system graphed in FIG. 4 are by way of example only and are subject to change according to design considerations. For instance, by changing the load rate (spring constant) of the torsion spring 86, the braking pressure during the depression of the inching pedal 16 through the angle D may be altered as represented by the phantom curve B' in FIG. 4.

As has been stated, the depression of the brake pedal 26 does not affect the operation of the inching mechanism 10 but results only in the actuation of the brake master cylinder 30. This is because (1) the jaws 82 of the inching pedal sleeve 18 are sufficiently spaced in the counterclockwise direction, as viewed in FIG. 1, from the jaws 84 of the brake pedal sleeve 28, and (2) the torsion spring 86 is unable to transmit the counterclockwise rotation of the brake pedal sleeve to the inching pedal sleeve. The brake pedal 26 may therefore be depressed as usual to retard the vehicle on a hill, to stop the vehicle on an emergency, to control its speed during normal run, and so forth.

It will of course be understood that various changes may be made in the form, details, arrangements, and proportions of the parts without departing from the scope of the invention as set forth in the appended claims.

What is claimed is:

1. In a motor vehicle, in combination:
   (a) a stationary shaft;
   (b) an inching mechanism for inching the vehicle, the inching mechanism comprising:
      (1) a first sleeve rotatably fitted over the stationary shaft;
      (2) an inching pedal formed on the first sleeve for revolving same about the stationary shaft;
      (3) an inching valve; and
      (4) a first linkage connecting the first sleeve to the inching valve to allow actuation of the latter by the inching pedal;
   (c) a braking mechanism for braking the vehicle, the braking mechanism comprising:
      (1) a second sleeve rotatably fitted over the stationary shaft;
      (2) a brake pedal formed on the second sleeve for revolving same about the stationary shaft;
      (3) a brake master cylinder; and
      (4) a second linkage connecting the second sleeve to the brake master cylinder to allow actuation of the latter by the brake pedal; and
   (d) means for interlocking the inching mechanism and the braking mechanism so that the depression of the inching pedal results in the actuation of both the inching valve and the brake master cylinder but that the depression of the brake pedal results only in the actuation of the brake master cylinder, the interlocking means comprising:
      (1) a first set of jaws provided to the first sleeve;
      (2) a second set of jaws provided to the second sleeve and meshing with the first set of jaws, there being clearances between the first and the second sets of jaws to allow the revolution of either first or second sleeve relative to the other within limits; and
      (3) resilient means connected between the first and the second sleeves so as to transmit only the revolution of the former, caused by the depression of the inching pedal, to the latter.

2. The combination of claim 1, wherein the resilient means comprises a torsion spring firmly anchored at one end to the first sleeve and having the other end normally held against an abutment on the second sleeve.

3. The combination of claim 1, wherein the first linkage comprises a lost motion mechanism adapted to allow the depression of the inching pedal for continued actuation of the brake master cylinder following full actuation of the inching valve.

4. The combination of claim 3, wherein the lost motion mechanism comprises a spring adapted to be deflected after the full actuation of the inching valve.

* * * * *